April 2, 1929.  J. F. ALVIN  1,707,455
VARIABLE CONDENSER FOR RADIO APPARATUS
Filed Dec. 30, 1925
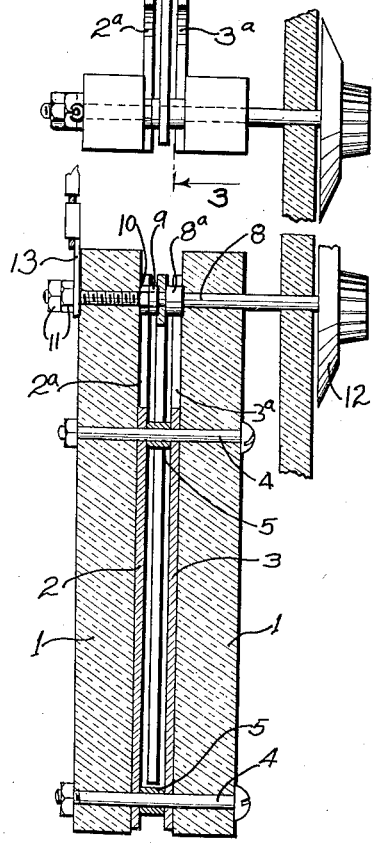
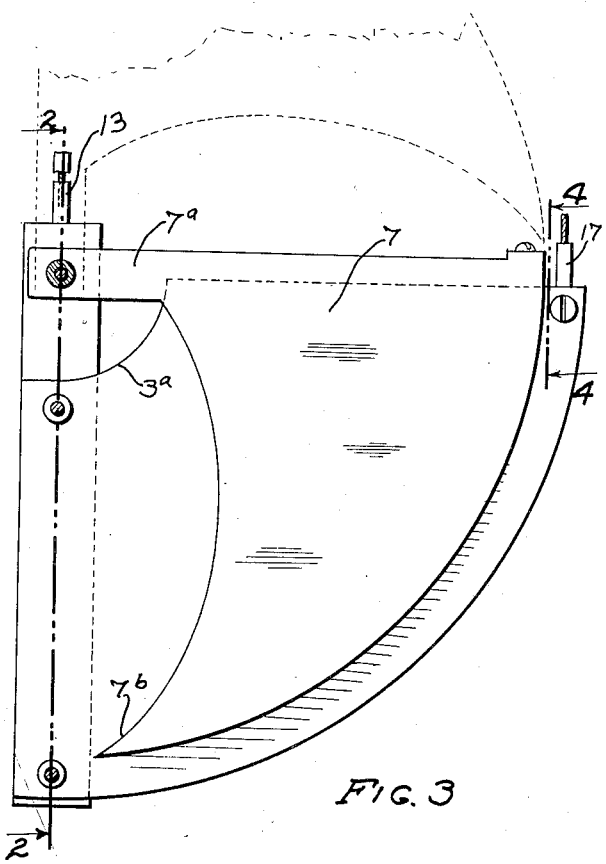
INVENTOR.
JACK F. ALVIN
BY A. B. Bowman
ATTORNEY Patented Apr. 2, 1929.

1,707,455

UNITED STATES PATENT OFFICE.

JACK F. ALVIN, OF SAN DIEGO, CALIFORNIA, ASSIGNOR OF ONE-HALF TO ANDREW DUMAS, OF SAN DIEGO, CALIFORNIA.

VARIABLE CONDENSER FOR RADIO APPARATUS.

Application filed December 30, 1925. Serial No. 78,303.

My invention relates to variable condensers for radio apparatus for obtaining minute adjustments of capacity, and the objects of my invention are: first, to provide a variable condenser of this class which may be adjusted for minute capacity and whereby minute adjustments of capacity may be made; second, to provide a variable condenser of this class in which one of the plates is provided with a substantially sharp point at one end, which plate increases in width towards its other end, whereby, when the plate provided with the sharp end is positioned with its sharp point in association with another plate of the condenser, a minute capacity for the condenser is provided, and whereby, when said plates are shifted into or to the side of each other, a gradual increase in capacity is obtained; third, to provide a condenser of this class having a rotor provided with a condenser plate decreasing in width from its normally outer end, in curved lines, towards its other end, the rotor being adapted to be shifted between spaced apart stator plates of the condenser; fourth, to provide a variable condenser of this class for radio apparatus in which the rotor and stator plates are made of considerable thickness, providing large capacity for the condenser; fifth, to provide stop means in connection with the rotor and stator plates of the condenser whereby the rotor is limited in its interpositioned relation with the stator plates so that the rotor can be operated and be shifted between the stator plates from one direction or end only; sixth, to provide novel and simple supporting means for a condenser of this class, and seventh, to provide as a whole a novelly constructed and arranged condenser of this class and one which is simple and economical of construction, durable, efficient, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a top view of my variable condenser for radios in its preferred form of construction; Fig. 2 is a sectional end elevational view thereof, taken through 2—2 of Fig. 3; Fig. 3 is a side elevational view thereof, showing by dotted lines the rotor plate shifted to its outward position, and Fig. 4 is a fragmentary sectional elevational view, taken through 4—4 of Fig. 3, showing the stop means in connection with the rotor and stator plates.

Like characters of reference refer to similar parts and portions throughout the several views of the drawings.

The main supporting means for my condenser consists preferably of a pair of supporting members or bars 1 made of insulating material and secured in spaced apart relation relatively to each other. Between the adjacent sides of the supporting members 1 are positioned the one edges of a pair of stator plates 2 and 3, which are positioned parallel with each other and spaced from each other by a pair of spacers 5 between the portions of the stator plates positioned between the supporting members 1, and another spacer 6 positioned between the extended portions of the stator plates, as shown best in Fig. 1. The supporting members 1 and the stator plates 2 and 3 are secured relatively to each other by means of a pair of bolts 4 extending through the various members and the spacers 5.

The upper portions of the stator plates 2 and 3, positioned between the supporting members 1, are cut out in circular form, as indicated by 2$^a$ and 3$^a$. Between the upper ends of the supporting members 1 and at the cut out portions of the stator plates 2 and 3 is pivotally mounted the arm 7$^a$ of the rotor plate 7. The end of the arm 7$^a$ is secured on the spindle 8 against an annular shoulder 8$^a$ on the spindle by means of a washer 9, and a nut 10. The shoulder 8$^a$ and the nut 10 serve to space the upper ends of the supporting members 1 from each other. The spindle 8 is provided at its one end, extending through one of the supporting members 1, with a pair of lock nuts 11. Between one of the lock nuts 11 and the supporting member 1 is secured a terminal member 13, which is adapted to be connected to the aerial of the radio apparatus. The opposite end of the spindle 8 extends preferably through the panel of the radio box and is provided at its outwardly extended end with a dial member 12, as shown. The upper edge of the rotor plate 7 extends substantially parallel with the upper edges of the stator plates when the rotor plate is wholly shifted intermediate the stator plates. The width of the rotor plate 7 decreases from its upper or normally outer edge towards its opposite or normally inner end to a sharp point 7b, in curved lines, forming substantially a half crescent. In the preferred construction the extension of the inner curve, forming the semi-crescent, bisects the upper or straight edge of the rotor 7 at a point intermediate the pivotal point and outer or circular edge of the rotor 7, the point being chosen such that the lower edge of the arm 7a and curved line meet at a point near the inner edge 3a of the stator plates 2 and 3, as clearly shown in Fig. 3. The outer edge of the rotor plate 7 at the remote portion from its pivotal support is circular, as are also the corresponding edges of the stator plates, as shown best in Fig. 3. It will be here noted that instead of the edges of the decreasing portion of the rotor plates being curved, said edges may be straight; however, the same uniform acceleration in adjustment of capacity would not be obtainable.

At the outer portion and preferably at the upper edge of the rotor plate 7 is provided a stop member 14, which is made of insulating material and preferably secured, by means of a screw 15, to the under side of a laterally bent lug 7c at the outer portion and the upper edge of the rotor plate.

The outer portions of the stator plates 2 and 3 are secured together near their upper edges by means of a bolt 16 which extends through said plates and the spacer 6, previously mentioned. To the bolt 16 is secured, by means of a pair of lock nuts 18, a terminal member 17, which is adapted to connect the stator plates of the condenser to the receiver.

It will be here noted that the rotor plate, as well as the stator plates, is of considerable thickness, the rotor plate being approximately 1/16 of an inch thick, and the stator plates each being also approximately 1/16 of an inch thick, and the former being spaced approximately 1/32 of an inch from each of the stator plates.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a variable condenser, a stator plate, and a rotor plate shiftably mounted relatively and parallel to the former, said rotor plate being relatively narrow at its one end and relatively wide at its opposite end and means on said rotor plate for compelling the relatively narrow portion of the rotor plate to be first shifted into association with the former.

2. In a variable condenser, a pair of insulating, spaced apart supports, a pair of stator plates mounted at their one edges in spaced relation between said supports, one edge of each stator plate being rounded forming substantially quarter-circle plates, and a substantially semi-crescent-shaped rotor plate provided with an extended portion at its large end, said extended portion being pivotally mounted on said supports at the portion of said stator plates opposite their curved edges, said rotor plate being positioned between and spaced from said stator plates and a laterally extending stop member on the large end of said rotor for compelling the pointed end thereof to be first shifted between said stator plates.

3. In a variable condenser, a pair of insulating, spaced apart supports, a pair of stator plates mounted at their one edges in spaced relation between said supports, said stator plates being substantially quarter-circular in shape and recessed at their axial portions, and a substantially quarter-circularly shaped rotor plate positioned between said stator plates with its axial portion pivotally mounted on and between said supports, the one side of said rotor plate being cut away in curved lines providing a rotor plate relatively sharp at one portion and relatively wide at its opposite portion and stop means on said wide portion adapted to engage the radial edge of one of said stator plates and limit the movement of said rotor plate.

In testimony whereof, I have hereunto set my hand at San Diego, California, this 15th day of December, 1925.

JACK F. ALVIN.